(12) United States Patent
Sowatskey et al.

(10) Patent No.: US 12,015,521 B2
(45) Date of Patent: Jun. 18, 2024

(54) USING AN APPLICATION PROGRAMMING INTERFACE (API) GATEWAY TO MANAGE COMMUNICATIONS IN A DISTRIBUTED SYSTEM

(71) Applicant: Cisco Technology, Inc., San Jose, CA (US)

(72) Inventors: Nathan Sowatskey, Madrid (ES); John Joyce, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 80 days.

(21) Appl. No.: 17/724,853

(22) Filed: Apr. 20, 2022

(65) Prior Publication Data
US 2023/0344707 A1   Oct. 26, 2023

(51) Int. Cl.
| | |
|---|---|
| *H04L 41/0816* | (2022.01) |
| *H04L 12/66* | (2006.01) |
| *H04L 41/0823* | (2022.01) |
| *H04L 43/08* | (2022.01) |
| *H04L 47/70* | (2022.01) |

(52) U.S. Cl.
CPC ......... *H04L 41/0816* (2013.01); *H04L 12/66* (2013.01); *H04L 41/0836* (2013.01); *H04L 43/08* (2013.01); *H04L 47/82* (2013.01)

(58) Field of Classification Search
CPC .. H04L 41/0816; H04L 41/0836; H04L 43/08
See application file for complete search history.

(56) References Cited

U.S. PATENT DOCUMENTS

| | | | |
|---|---|---|---|
| 10,097,624 B1 | 10/2018 | Palladino et al. | |
| 10,217,145 B1* | 2/2019 | Ye | H04L 43/16 |
| 10,511,690 B1* | 12/2019 | Chatterjee | H04L 43/16 |
| 11,032,160 B1 | 6/2021 | Raheja | |
| 2015/0128103 A1 | 5/2015 | Stratton et al. | |
| 2021/0006496 A1 | 1/2021 | Xiong et al. | |
| 2021/0136095 A1* | 5/2021 | Dinh | G06N 5/003 |
| 2021/0294717 A1* | 9/2021 | Wang | G06F 11/3409 |
| 2021/0297355 A1* | 9/2021 | Bartholomew | H04L 47/781 |
| 2021/0306336 A1* | 9/2021 | Exton | H04L 63/101 |
| 2021/0409275 A1* | 12/2021 | Galchenko | H04L 41/0895 |

(Continued)

FOREIGN PATENT DOCUMENTS

| | | |
|---|---|---|
| CN | 110944044 A | 3/2020 |
| EP | 2622908 B1 * 12/2016 | ............ H04M 15/70 |

*Primary Examiner* — Jeffrey R Swearingen
(74) *Attorney, Agent, or Firm* — Lee & Hayes P.C.

(57) ABSTRACT

Techniques for an Application Programming Interface (API) gateway to workload placement and load balancing in a distributed system. The API gateway may route API requests, responses, and so forth, via a plurality of paths between the API gateway, API endpoint devices and API client devices. The API gateway may collect the path properties for the plurality of paths between itself, and the client devices and API endpoints. Additionally, or alternatively, the API gateway may collect process properties indicating the statistics of specific processes. Using this data, the API gateway may determine that a particular path, a particular process, etc., has experienced performance degradation. The API gateway may further determine, and perform, a remedial action to take to remedy the performance degradation of the path or processes.

20 Claims, 10 Drawing Sheets

(56) References Cited

U.S. PATENT DOCUMENTS

| | | | |
|---|---|---|---|
| 2022/0174485 A1* | 6/2022 | Abhigyan | H04L 63/0807 |
| 2022/0225065 A1* | 7/2022 | Doken | H04L 67/1008 |
| 2022/0276917 A1* | 9/2022 | Carr, Jr. | G06F 9/547 |
| 2023/0246927 A1* | 8/2023 | Siakou | H04L 41/046 |
| | | | 709/223 |

* cited by examiner

USING AN APPLICATION PROGRAMMING INTERFACE (API) GATEWAY TO MANAGE COMMUNICATIONS IN A DISTRIBUTED SYSTEM

TECHNICAL FIELD

The present disclosure relates generally to techniques for load balancing and workload optimization in a network. More specifically, it is directed to mechanisms and techniques to take into account path properties for load balancing in an Application Programing Interface (API) gateway.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Computing networks have continued to become more complex, such as with the introduction of software-defined networks (SDNs). In SDNs, the management of networks is centralized at a controller or orchestrator such that the control plane is abstracted from the data forwarding functions in the discrete networking devices. The SDN orchestrator is the core element of an SDN architecture and enables centralized management and control, automation, and policy enforcement across physical and virtual network environments. Various standards or protocols have been developed for SDN architectures, such as OpenFlow, Programming Protocol-independent Packet Processors (P4), open virtual switch database (OVSDB), and so forth. These SDN protocols allows the SDN orchestrator to directly interact with the forwarding plane of network devices (such as switches and routers) using, for example, various application programming interfaces (APIs).

In an SDN, a plane is an abstract conception of where certain processes take place. The two most commonly referenced planes in networking are the control plane and the data plane (also known as the forwarding plane). The control plane is the part of a network that controls how data packets are forwarded—meaning how data is sent from one place to another. The process of creating a routing table, for example, is considered part of the control plane. Routers use various protocols to identify network paths, and they store these paths in routing tables. In contrast to the control plane, which determines how packets should be forwarded, the data plane forwards the packets. In conventional networking the control and data plane are implemented in the firmware of routers, switches, and/or embedded systems. However, in the SDN data and control planes are decoupled, the control plane is removed from network hardware, and it is implemented in software instead, which enables programmatic access, and as a result makes network administration much more flexible.

In a cloud computing system, front-end clients (mobile, web, and desktop applications) require a communication channel to interact with back-end microservices. In one simple implementation, the front-end client may directly communicate to the backend microservices. Instead, a widely accepted design is to implement an Application Programing Interface (API) gateway between the front-end application and back-end services. The API Gateway service abstracts the back-end core microservices. Implemented as a web API, it acts as a reverse proxy, routing incoming traffic to the internal microservices. Additionally, the gateway insulates the client from internal service partitioning and refactoring. If a change is made to back-end service, it may be accommodated in the gateway without breaking a client device. Further, an API gateway is the first line of defense for cross-cutting concerns, such as identity, caching, resiliency, metering, and throttling. Many of these cross-cutting concerns can be off-loaded from the back-end core services to the API gateway, simplifying the back-end services.

Various challenges arise when deploying an API gateway with load balancing functionality. In this case, a request for a given API can be sent to one, or many, of more than one possible endpoint that can process the API request. Those endpoints are processes subject to variances in load, trustworthiness, cost geographical location, and/or various other properties. Further, the endpoints may be reached over paths that have various kinds of respective properties, as well as latency and other attributes. Finally, endpoints may be moved for purposes including workload optimization, system architecture resilience, secure placement, compliance, and so on. Given that workloads should be assumed to be generally subject to optimization in this way, consideration also has to be given to optimization of the path from API client to API gateway, optimization of the path from the API gateway to the endpoint workload(s) implementing the API, and optimization of the of the API gateway process and run-time environment itself. The placement of the API gateway can be optimized with respect to the location of, and path to, the API client, the location of, and path to, the API implementing endpoint workload, the properties of the paths that connect these elements, and cross-cutting concerns of compliance, security, resiliency, efficiency, and so on.

Thus, there is a need for an API gateway with load balancing functionality including mechanisms for providing data about the status and properties of endpoint workloads, the path to those workloads, and how those workloads are being managed and optimized in order to make better decisions, add value, and determine which endpoints to optimally dispatch an API request to. Similarly, the API gateway needs to know about the API clients, where they are, what path they are making requests over, what cross-cutting concerns apply, and so be able to take into account these aspects of the API clients to inform decisions about optimizing the API gateway itself, and so that the API gateway can inform how the API endpoint workloads are optimized. Additionally, the provided mechanisms enable the API gateway to detect increased load, from API clients, for given set of APIs, in a variety of circumstances, which can be similarly used to inform and optimize load-balancing decisions for the API gateway itself, and endpoint workloads. In this way, the provided mechanisms enable the API gateway to signal workload optimization systems to move the endpoints and/or increase the endpoints numbers in the network, as well as signal SDN systems to change properties of the network paths between the API client, API gateway, and API endpoint, within the context of a system that is constantly changing its configuration in a dynamic manner and optimizing that system.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 further illustrates a network API gateway and its serving endpoints for processing a packet between or across networks.

DESCRIPTION OF EXAMPLE EMBODIMENTS

Overview

Figure 1:
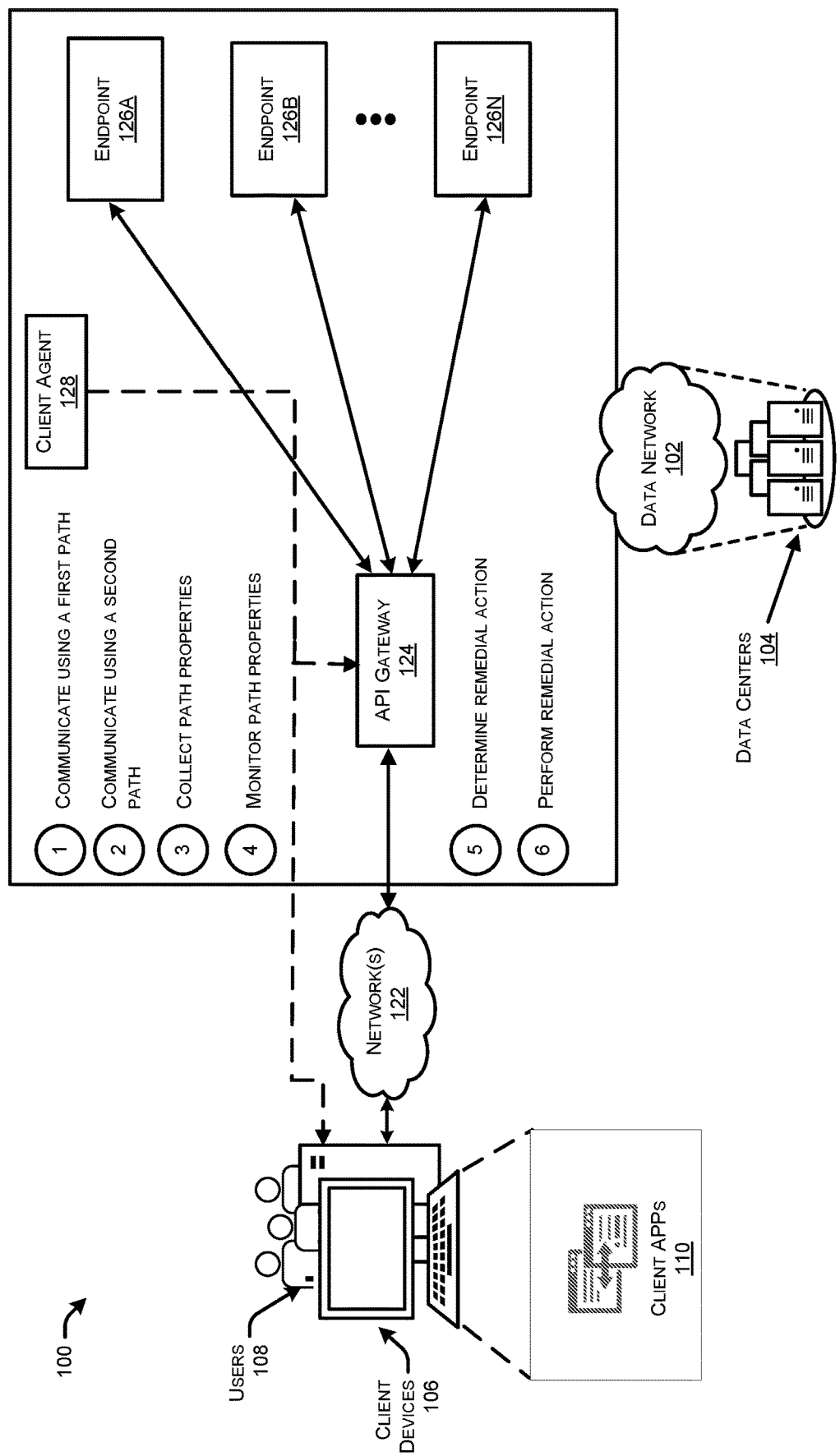
FIG. 1 illustrates a system diagram of network architecture for performing workload optimization for an API gateway.

The present disclosure describes an approach that allows an Application Programming Interface (API) Gateway in a network to perform load balancing and workload optimization. The API gateway may perform load balancing based on path properties of paths between the API gateway and endpoints, and/or on process properties of the endpoints themselves.

This disclosure further describes a method for monitoring one or more paths between a client device and the API gateway or between the API gateway and an endpoint. The method may include identifying a first path between a client device and the API gateway to communicate API requests. Further, the method may include identifying a second path between the API gateway and an endpoint that services the API requests. Moreover, the method may include collecting one or more path properties associated with at least one of the first path or the second path. In addition, the method may include monitoring the one or more path properties to determine that the at least one of the first path or the second path has experienced performance degradation. In some instances, the method may additionally, or alternatively, include determining that at least one of the first path or the second path is not compliant with constraints implied by properties of the API, and/or an invocation of the API with specific query parameters and/or header payload. Furthermore, the method may include determining a remedial action to take to remedy the performance degradation experienced by the at least one of the first path or the second path. Finally, the method may include performing the remedial action.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques to improve API gateway efficiency in a data network. Specifically, the techniques and mechanisms described herein enable the API gateway to use path properties to optimize and balance its requests and workload. For instance, modern high traffic websites must serve hundreds of thousands, if not millions, of concurrent requests from users or clients and return the correct text, images, video, or application data, all in a fast and reliable manner. To cost effectively scale to meet these high volumes, modern computing best practice generally requires adding more servers. The API gateway load balancer act as the "traffic cop" sitting in front of your servers and routing client requests across all servers capable of fulfilling those requests in a manner that maximizes speed and capacity utilization and ensures that no one server is overworked, which could degrade performance. If a single server goes down, the load balancer redirects traffic to the remaining online servers. When a new server is added to the server group, the API gateway load balancer automatically starts to send requests to it.

In some instance, an API gateway sits between a client device and one or more endpoints, which could be physical devices and/or logical processes. The API gateway may act as a reverse proxy to accept all the API calls, aggregate the various services required to fulfill them, and return the appropriate result. The endpoints are examples of processes, which are subject to variances in load, cost, geographical location, regulatory compliance, and similar properties. Further, the endpoints may be reached over paths that have similar properties (e.g., latency, regulatory, encryption, and similar attributes). Finally, the endpoints can be moved to balance the workload at the API gateway, or to place or instantiate workloads in run time environments that satisfy specific regulatory constraints, for example geographical location. Similarly, the API gateway may perform a path optimization, and change the path from the API client device to API gateway to balance its load, or the properties of the path to address regulatory or compliance constraints such as encryption, or so that the path is within specific geographical constraints.

In some instances, the techniques may be utilized in a Software Defined Networking (SDN) data network. SDN allows dynamic configuration of the network by taking a new approach to the network architecture. SDN is a fully software driven and performs all digital signal processing using programmable digital signal processors, general purpose microprocessors, or field programmable gate arrays. All functions, modes, and applications can be reconfigured by software.

In some examples, the techniques and mechanism provided herein include mechanism for load balancing in an API gateway. In some variants, the load balancing gateway may be integrated with mechanisms that could provide data about the status of endpoints workloads, the path to those workloads, and the workload management and optimization mechanisms. As a result, these techniques enable the API gateway to make better informed decisions, adding value and optimizing by determining which endpoints the API gateway will dispatch to when receiving request from clients with specific properties, or for APIs with specific properties, or for API requests with specific properties, or given specific path properties, and combinations thereof. In some examples, the API gateway may be able to detect increased load for the API, in a variety of circumstances. In this regard, the API gateway may signal workload optimization system to move endpoints (or "endpoint processes" or simply "processes"), auto-scale network links (e.g., SD-WAN, LAN, etc.), and similar actions in response to the API gateway awareness of API request load, and other properties associated with API request source and path from source. As described herein, and "endpoint" (or "endpoint process" or "endpoint") may be a physical device, or a virtual resource such as a virtual machine, a container, a serverless function, a process, and/or any type of function. Traditionally, the API gateway system may not be integrated with load balancing mechanisms, or composed of multiple, distributed, federated, coordinated gateways, and it may not form an awareness of the entirely of the multi-cloud runtime of distributed services, and thus it will be unable to use awareness for optimization.

In some examples, the API gateway may detect abnormalities in the API requests or responses for the given APIs, in a variety of circumstances. In response to detecting abnormalities, the API gateway may initiate workload optimization actions. The abnormalities may include increased load request volumes, increased response latency from the API endpoint and/or in requests from the client and/or in responses to the client, business transaction failures, a higher rate of failures such as transport timeouts, and so on. In some examples, when the API gateway detects abnormalities, the API gateway may perform several actions including: (i) Spawning more endpoints (ii) Moving endpoints or API gateway processes (iv) Adjusting path capacity from the client to API Gateway and/or the API Gateway to the API endpoint (vi) changing the SD-WAN topology to use different paths (vii) Applying encryption, QoS headers, or other packet level changes to the traffic between the client, API Gateway, and/or API endpoint.

In some examples, the techniques described herein allow the components to be co-located in a single environment or distributed in multiple environments. For examples, multiple gateways may be federated to distribute and balance load across endpoints wherever they may reside. Further, the agents that are interacting with the gateway to supply status or perform actions may likewise be distributed and/or federated to enable consistent behavior across geographical, implementation runtime or administrative boundaries.

Additionally, the techniques described herein may increase the breadth of components that an API gateway can interact with. As a result, this may enable the API gateway to obtain more complete view of API requests as well as current status of the requests processing.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system diagram of an example system diagram of network architecture for performing workload optimization in an API (Application Programing Interface) according to some aspects of the current disclosure. FIG. 1 further illustrates a network API gateway and its serving endpoints for processing a packet between or across networks. System architecture 100 includes a network architecture 102 that may include one or more data centers 104. FIG. 1 further illustrates API gateway 124 and endpoints devices 126 in the network architecture 102 provides an interface for connecting the client devices 106 to network 102 via the network(s) 122. Also, FIG. 1 include the client applications 110, which may interact with the API gateway via the client devices 110.

In some examples, the network architecture 102 may include devices housed or located in one or more data centers 104. The network architecture 102 may include one or more networks implemented by any viable communication technology, such as wired and/or wireless modalities and/or technologies. The network architecture 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers. The network architecture 102 may include various hardware devices, such as routers, switches, gateways, smart NICs, NICs, ASICs, FPGAs, servers, and/or any other type of device. Further, the network architecture 102 may include virtual resources, such as VMs, containers, and/or other virtual resources. Additionally, or alternatively, the techniques described herein are applicable to container technology, such as Docker®, Kubernetes®, and so forth.

The one or more data centers 104 may be physical facilities or buildings located across geographic areas that designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The client device 132 may identify communication connections over one or more networks 130 to communicate with devices in the network architecture 102, such as API gateway 124, and endpoints 126. The network(s) 122 may include any viable communication technology, such as wired and/or wireless modalities and/or technologies. Networks 122 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The user device 108 may communicate using any type of protocol over the network 122, such as the transmission control protocol/Internet protocol (TCP/IP) that is used to govern connects to and over the Internet.

The endpoints device 126 may include any network capable hardware/software devices that can connect to the network architecture 102 using any type of communication protocol. For instance, the endpoint devices 126 can refer to desktop computers, laptops, smartphone, tablets, printers, or any other specialized hardware such as sensors, actuators, smart meters, etc. The client devices 106 may include network interfaces to connect to the network architecture 122. In some examples the client device 106 may include software to perform security protocol to enable them to communicate to the network architecture 122.

The API gateway 124 connects the network nodes such as endpoint devices 124 to the network 122. Also, the gateway 124 may as a proxy to accept all API requests, perform various services required to fulfill them, and return the appropriate result. In some examples, the API gateway 124 may include a workload optimizer that can move workload between runtime environments to achieve optimal conditions. In some variants, the API gateway 124 may detect a degradation in the path to an endpoint 124, and determines whether the endpoints need to be moved to a new location.

The API gateway 124 may sit in the edge of network architecture 102 and network 130, and provide connectivity of the nodes of network architecture 102 such as endpoint devices 126 to the nodes of network architecture 122 such as client devices 106. The API gateway 124 manages the workloads of the endpoint's devices 126. In some examples, the endpoints devices 126 may be subject to variances in load, trustworthiness, cost, geographical location, regulatory compliance, and similar properties. In some examples, the endpoint devices 126 may be reachable from the API gateway over routes or links that have also have similar properties, as well as latency, routing, encryption, and other attributes.

In some examples, the API gateway 124 may include mechanisms that may provide status of endpoints workloads, the path to those workloads, and how the workloads may be managed and optimized. The API gateway 124 may initiate a workload optimization action to manage abnormalities in API requests such as increased request loads, increased response latency, business transaction failures, a higher rate of connections failures, and similar. As a result, the API gateway may move the endpoints, performs auto-scaling, increases number of endpoints, etc.

At "1", the client device communicates API requests using a first path that is established between the client device and the API gateway. The client device may include client apps triggered by the users (e.g., mobile, web, etc.) to perform specific tasks on the server. The first path carries user requests from the client apps to run services to the gateway. It may also carry other cross-cutting signaling such as authentication, encrypted or decryption signaling data. As described herein, a client agent may provide a means to communicate information about the information about the client devices 106 and the path to the client devices 106.

At "2', the API Gateway communicates with one or more of the API endpoints 126 using one or more second paths established between the API gateway and the one or more API endpoints 126. With the established path(s), each of the one or more endpoint(s) 126 may be accessible by the client devices. In some examples, a load balancer may be placed in the path from the client devices to the endpoints. The load balancer may enable the API gateway to send API requests to one or more endpoints. In some examples, a load balancer proxy may be placed between the clients and the API gateway 124, and/or the API gateway 124 and the endpoint (s) 126.

At "3", the API gateway may collect the path properties associated with at least one of the first path or second path. These path properties may be related to variances in the load, trustworthiness, cost, geographical location, etc. A path property component (agent) of the API gateway 124 may provide data about network paths, including their capacity, latency, jitter, routing hops, etc. In some examples, the endpoints are reachable from the API gateway 124, and may have similar path properties (e.g., capacity, latency, jitter, routing hops, etc.), as well as latency routing and other attributes. Once the API gateway collects the path properties, it may analyze any of the properties or changes thereof, for example detecting path degradation, and may prepare a remedial action to change properties of the path to reduce degradation as described herein.

At "4", the API gateway monitors path properties to see if it can detect any abnormalities in the traffic for API requests or responses for a given APIs, in a variety of circumstances. The abnormalities may include increased request load, increased response latency, business transaction failures, a higher rate of connection failures, etc. In some examples, the API gateway detects abnormalities from the path properties reported by the path property component (agent).

At "5", the API gateway determines a remedial action to overcome the abnormalities. For example, the remedies may include spawning more endpoints, moving endpoints or API gateway processes, auto-scaling, or changing SD-WAN paths, applying encryption, etc. These remedies may be possible due to the API gateway's awareness of various properties, including, but not limited to, API request load, properties associated with a specific API request, properties associated with the API request source client, path from client to API gateway, path from API gateway to API endpoints, and awareness of the other API gateways. In some examples, the remedial action may include several mechanisms that can distribute load across a set of workloads that can handle a request, while spanning over multiple cluster boundaries. The remedial action may additionally, or alternatively, remedy degradation in the path properties by selecting/spawning endpoints based on the path properties.

At "6, the API performs the remedial action as described above, and initiates, for example, a workload optimization, path optimization, etc. In some examples, the API gateway may move workloads between runtime environments to achieve optimal conditions, as a consequence of actions based on its awareness of system state, and/or as consequences of signals about state from other system components.

It is worth to mention that the techniques described in the steps 1-6 describe an integrated API which includes mechanisms for coordinating API client devices requests and workload and path optimization. The integrated gateway, as described above, can provide better-informed decisions than a gateway that is not able to take into account the range of properties that are described above, and may play an integrated role with the other systems components. Further, an integrated and coordinating API gateway system, may include multiple distributed coordinating gateways, and may perform an awareness of the entirety of the multi-cloud runtime of distributed services. Accordingly, it may use the awareness to optimize workloads or paths in a way that no single component in the environment may be able to perform.

Figure 2:
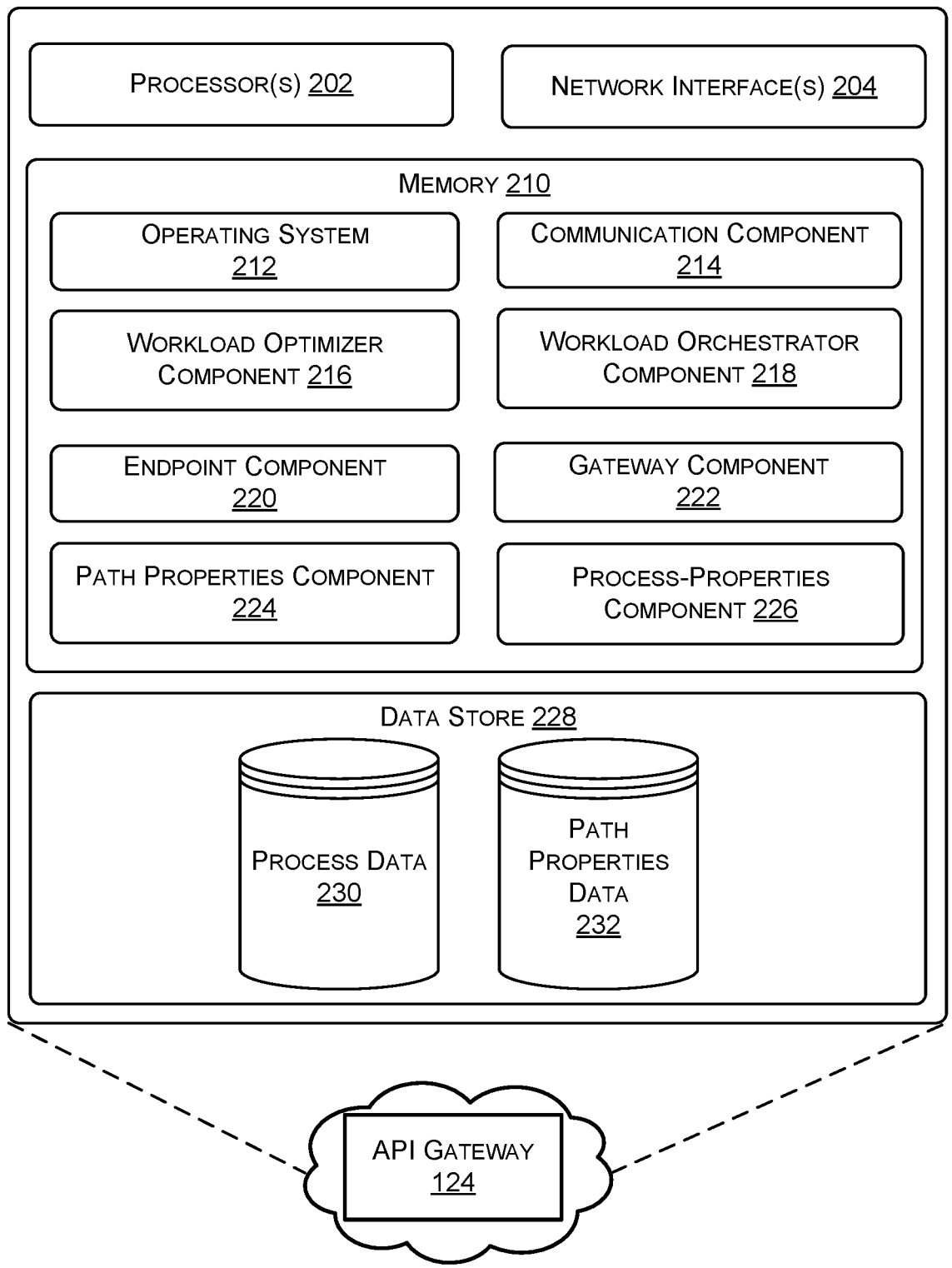
FIG. 2 illustrates a component diagram of an API gateway that can be utilized to implement aspects of the technologies disclosed herein.

FIG. 2 illustrates a component diagram of an example API gateway 124 that can be utilized to implement aspects of the technologies disclosed herein. The API gateway 124 may be any type of computing device capable of capable of receiving API requests from API clients, processing that request in various ways as a proxy for the API request, and then dispatching that request to a number of API endpoints.

As illustrated, the API gateway 124 may include one or more hardware processors 202 (processors), one or more devices, configured to execute one or more stored instructions. The processor(s) 202 may comprise one or more cores. Further, the API gateway 124 may include one or more network interfaces 204 configured to provide communications between the API gateway and/or other systems or devices in the network architecture 102, network 122 and/or remote from the networks 102, 122. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth. It will be appreciated that the API gateway 124 might not include all of the components shown in FIG. 2, can include other components that are not explicitly shown in FIG. 2, or might utilize an architecture completely different than that shown in FIG. 2.

The API gateway 124 may also include memory 210, such as computer-readable media, that stores various executable components (e.g., software-based components, firmware-based components, etc.). The memory 210 may generally store components to implement functionality described herein. The memory 210 may store an operating system 212 utilized to control the operation of components of the API gateway 124. The operating system 212 may also acts as an intermediary between the functions of the API gateway and other devices. Further, the memory 210 may store a communication component 214 that comprises software (e.g., any protocol stack) to enable the API gateway 124 to communicate with other devices using the network interface 204. The communication component 214 may also include mechanisms to encode, decode and process the communication signals transmitting/receiving to/from other devices.

In some examples, the memory 210 may include a workload optimizer component 216 configured to enable API gateway 124 to move workloads between runtime environments. A workload orchestrator component 218 manages the deployment of workloads in specific runtime environment. In some examples, the workload optimizer 216 may move workloads as a consequence of actions based on information it receives from a path properties component 226 and/or process-properties component 226, or received from the signals from the other network devices. An endpoint component 220 includes logic to respond to an API request. In some examples, the endpoint component 220 may include a process that embodies coded logic to respond to an API request. In some examples, such processes may be implemented in a programming language such as Java, Python, Go, etc. A gateway component 222 may process API requests and dispatch such requests to API endpoints 126. In some examples, the gateway component 222 may act a proxy for API requests and dispatch such requests to API endpoints 126. The path properties component 224 supplies data about network paths. For instance, the path properties data 232 may include path capacity, latency, jitter, routing hops, Boarder Gateway Protocol (BGP) Autonomous System Number (ASN), encryption type, etc. A process properties component 226 provides process data 230 about the status of specific processes representing API endpoints 126. For example, this data 230 may include processing logic errors, relationships with other network devices, and response times of requests to other processes, performance of the process, location for data sovereignty purposes, and memory and processor consumption.

In some examples, the memory 210 may store a component configured to enable the API gateway 124 to store the list of the workloads and endpoints, and the relationships between them, in the data store 228. A storing component comprises a human readable code or binary machine code, when executed on the processor 202, may enable the API gateway 124 to store the list of workloads and endpoints in the data store 228.

The API gateway 124 may further include the data store 228, which may comprise any type of computer memory including long-term memory (e.g., Read Only Memory (ROM), Random Access Memory (RAM), caches, etc.). The data store 228 may include a workload data list 230 which includes workload data and the associated environment. Further, the data store 228 may include a path properties data list which includes paths properties data, and data about status of processes.

Figure 3:
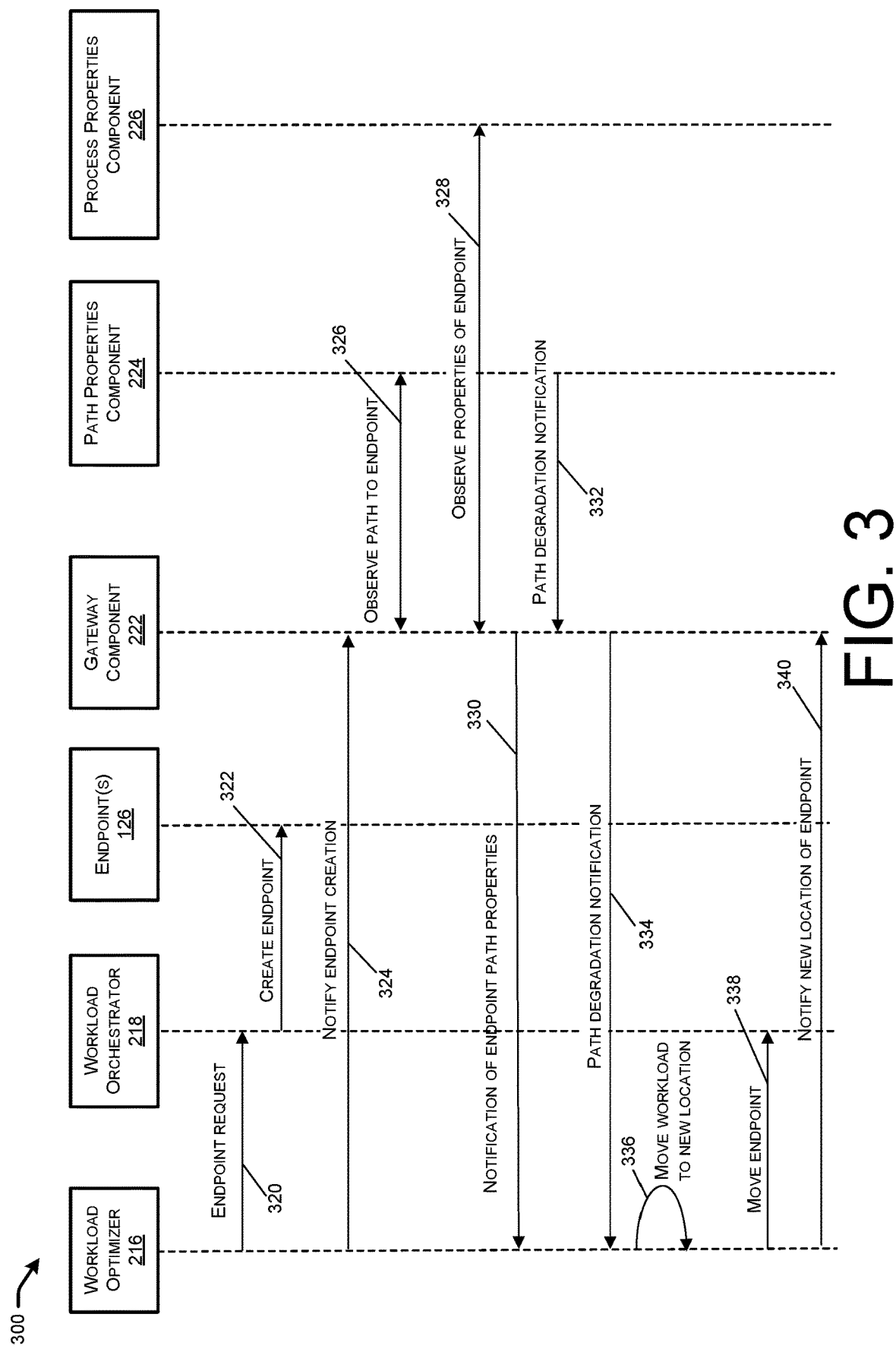
FIG. 3 illustrates a flow diagram of an example method for an API gateway detecting a path degradation.

FIG. 3 illustrates a flow diagram of an example method for an API gateway 124 to detect path degradation in a path to a given endpoint to which an API request is directed. If the API detects a path degradation, it may move the endpoint to a new location. Additionally, FIG. 3 illustrate communication flow between the network devices according to some aspect of the present disclosure described herein.

At step 320, workload optimizer 216 request workload orchestrator 218 to create an endpoint. In some examples, the workload optimizer can move workloads between runtime environments to achieve optimal conditions, according to its own awareness of system state, signal received from other system components. For example, the workload optimizer 216 can be a real-time decision engine that drives continuous health of applications/processes across on-premises and public cloud environments. The workload optimizer 216 may continuously analyze workload consumption, costs, and policy constraints across the full stack.

At step 322, the workload orchestrator 218 create the endpoint 126 according to the request it received from the workload optimizer 216. The workload orchestrator 218 may mange the deployment of workload in specific runtime environments. For examples runtime environments include vSphere/vCenter, Kubernetes (K8s) pods, VM, deployment services from public cloud providers, etc.

At step 324, the workload optimizer 216 notifies the creation of endpoint to the gateway component 222 of the API gateway 124. In some examples, an API endpoint includes a process that embodies coded logic to respond to API request. Such processes may be implemented in Java, Python, Go, etc., and may be run within VMs, containers in K8s, Operating Systems (OSs) running on base metal, etc.

At step 326, path properties component 224 observes the path to the endpoint. The path properties component, may supply data about network paths including their capacity, latency, jitter, routing hops, BGP ASN, encryption type, etc. For example, the path properties component may be implemented by cloud services, enterprise services, and/or endpoint agents.

At step 328, process properties component 226 observes properties of endpoint. The process properties component 226 may provide the status of specific processes representing API endpoints described herein, and the runtime environment within which, the gateway, endpoint, or client process are running. Such data may include processing logic errors, relationship with other network devices, and response time requests, other processes, performance of the processes, memory, and CPU consumption with respect to baseline and available resources, etc. For example, the process properties component may be implemented by AppDynamics App server, machine and network components, and the Cisco secure application capabilities of the AppDynamics Java Agents.

At step 330, the API gateway notifies workload optimizer 216 of the endpoint path properties.

At step 332, the path properties component 224 notifies the gateway component 222 about a degradation in the path from the API gateway 124 to the endpoint 126.

At step 334, the gateway component 222 notifies the workload optimizer 216 that degradation in the path from the endpoint to the API gateway 124 has occurred, and also includes the properties of the degraded path in the message.

At step 336, the workload optimizer 216 may use the received path properties, and decide to move the endpoint or change the path based on received information of the degraded path.

At step 338, the workload optimizer 216 instructs the workload orchestrator 218 to move the endpoint to a new location. Note that there can be one or more workload orchestrators 218 for different runtime environments.

At step 340, the workload optimizer 216 notifies the gateway component 222 of moving the endpoint 126 to a new location. Note that, the new location may be the same or a different hostname and/or IP address. The API gateway 124, as a proxy of the API endpoint for the API client, will be able to direct API request to the new location of the API endpoint work in a way that is transparent to the API client.

Figure 4:
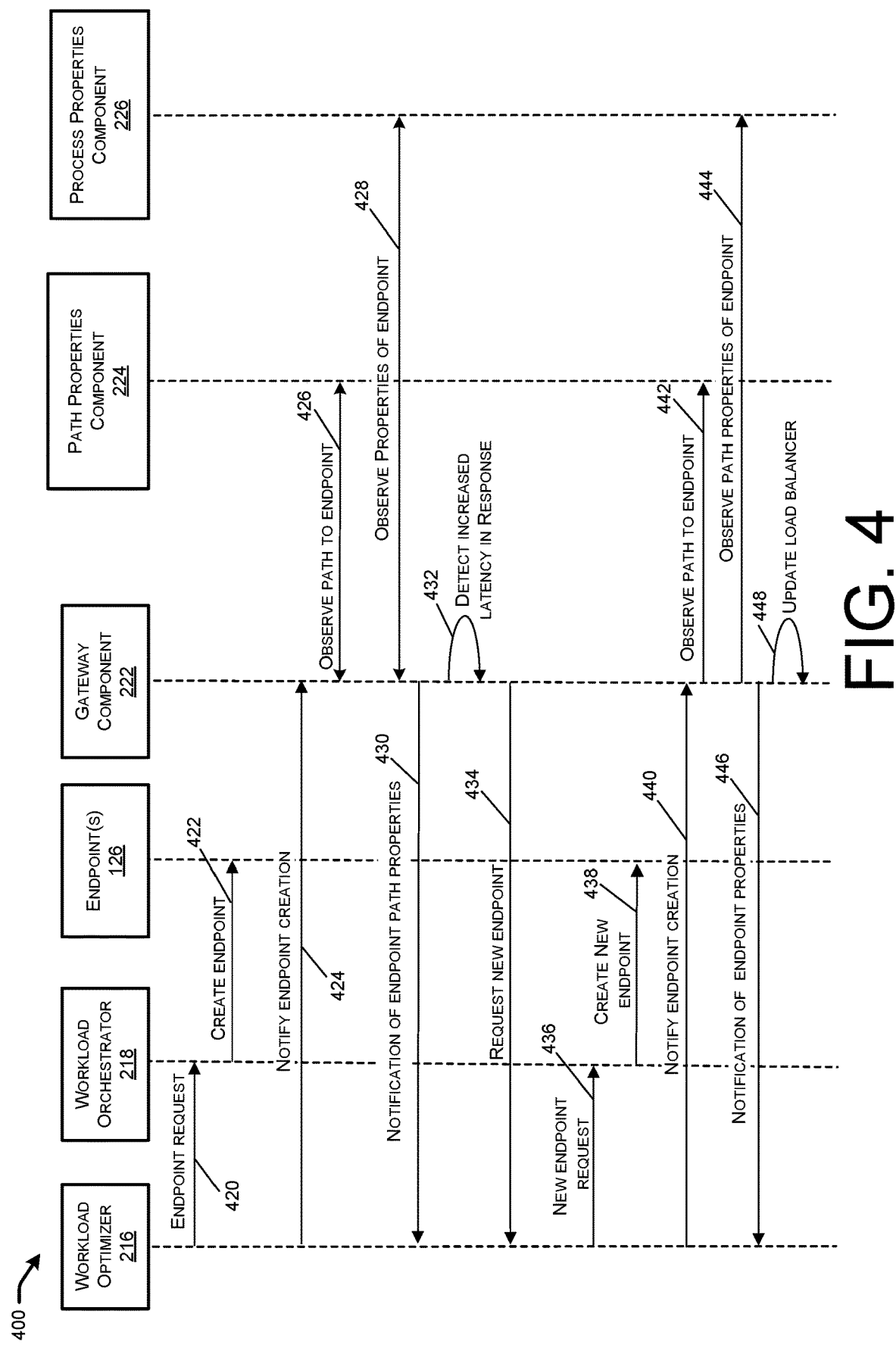
FIG. 4 illustrates a flow diagram of an example method for an API gateway performing remedial action to a path degradation.

FIG. 4 illustrates a flow diagram of an example method for an API gateway 124 performing remedial action to a path degradation. In this example, the API gateway may be used to monitor and perform remedial steps if it detects degradation in the latency of the response from the API endpoint or the response sent to clients of the API requests.

At step 420, workload optimizer 216 request workload orchestrator 218 to create an endpoint. In some examples, the workload optimizer can move workloads between runtime environments to achieve optimal conditions, according to its own awareness of system state, signal received from other system components. For example, the workload optimizer 216 can be a real-time decision engine that drives continuous health of applications/processes across on-premises and public cloud environments. The workload optimizer 216 may continuously analyze workload consumption, costs, and policy constraints across the full stack.

At step 422, the workload orchestrator 218 creates the endpoint 126 according to the request it received from the workload optimizer 216. The workload orchestrator 218 may mange the deployment of workload in specific runtime environments. For, examples runtime environments include vSphere/vCenter, Kubernetes (K8s) pods, VM, deployment services from public cloud providers, etc.

At step 424, the workload optimizer 216 notifies the creation of endpoint 126 to the gateway component 222 of the API gateway 124. In some examples, an API endpoint 126 includes a process that embodies coded logic to respond to API request. Such processes may be implemented in Java, Python, Go, etc., and may be run within VMs, containers in K8s, OSs running on base metal, etc.

At step 426, path properties component 224 observes the path to the endpoint 126. The path properties component 226 may supply data about network paths including their capacity, latency, jitter, routing hops, BGP ASN, encryption type, etc. For example, the path properties component 224 may be implemented by a cloud-based software-as-a-service (SaaS) service that utilizes monitoring probes to measure network performance, enterprise resources, and/or endpoint components.

At step 428, process properties component 226 observes properties of one or more endpoints 126. The process properties component 226 may provide the status of specific processes representing API endpoints 126 described herein, and the runtime environment within which, the gateway, endpoint, or client process are running. Such data may include processing logic errors, relationship with other network devices, and response time requests, other processes, performance of the processes, memory, and CPU consumption with respect to baseline and available resources, etc. For example, the process properties component 226 may be implemented by a server of a service that enables observation and visualization of technology stacks, machine and network components, agents that are utilized by services which automatically block threats to applications, and so forth.

At step 430, the gateway component 222 notifies workload optimizer 216 of the endpoint path properties.

At step 432, the gateway component 222 detects increased latency related to degradation being detected by gateway(s). In some examples, the API gateway includes a set of one or more federated API gateways, which may monitor various degradation conditions of API request and response flow.

At step 434, the workload optimizer 216 requests the gateway component 222 to increase the number of the API endpoints 126, and thus request creation of new endpoints.

At step 436, the workload optimizer 216 requests the workload orchestrator 218 to create one or more new endpoints 126. At step 438, the workload orchestrator creates the one or more new endpoints 126.

At step 440, the workload optimizer 216 notifies creation of new endpoints 126 to the gateway component 222. At step 442, the path properties component 224 observes the path from the API gateway 124 to the newly created endpoint 126 (this step may be similar to the step 426).

At step 444, the process properties component 226 observes the path properties of the endpoint 126 (this step may be similar to the step 428).

At step 448, the gateway component 222 sends the endpoint properties to the workload optimizer 216. The API gateway 124 may act as a proxy of the API endpoint for the API client and may be able to direct API request to the new location of the API endpoint work in a way that is transparent to the API client.

At step 448, the API gateway 124 optimizes its workload balancing. In this step the API gateway 124 may distribute the workload over any newly created endpoints, and may alleviate the constraint or degradation detected in the step 432.

Figure 5:
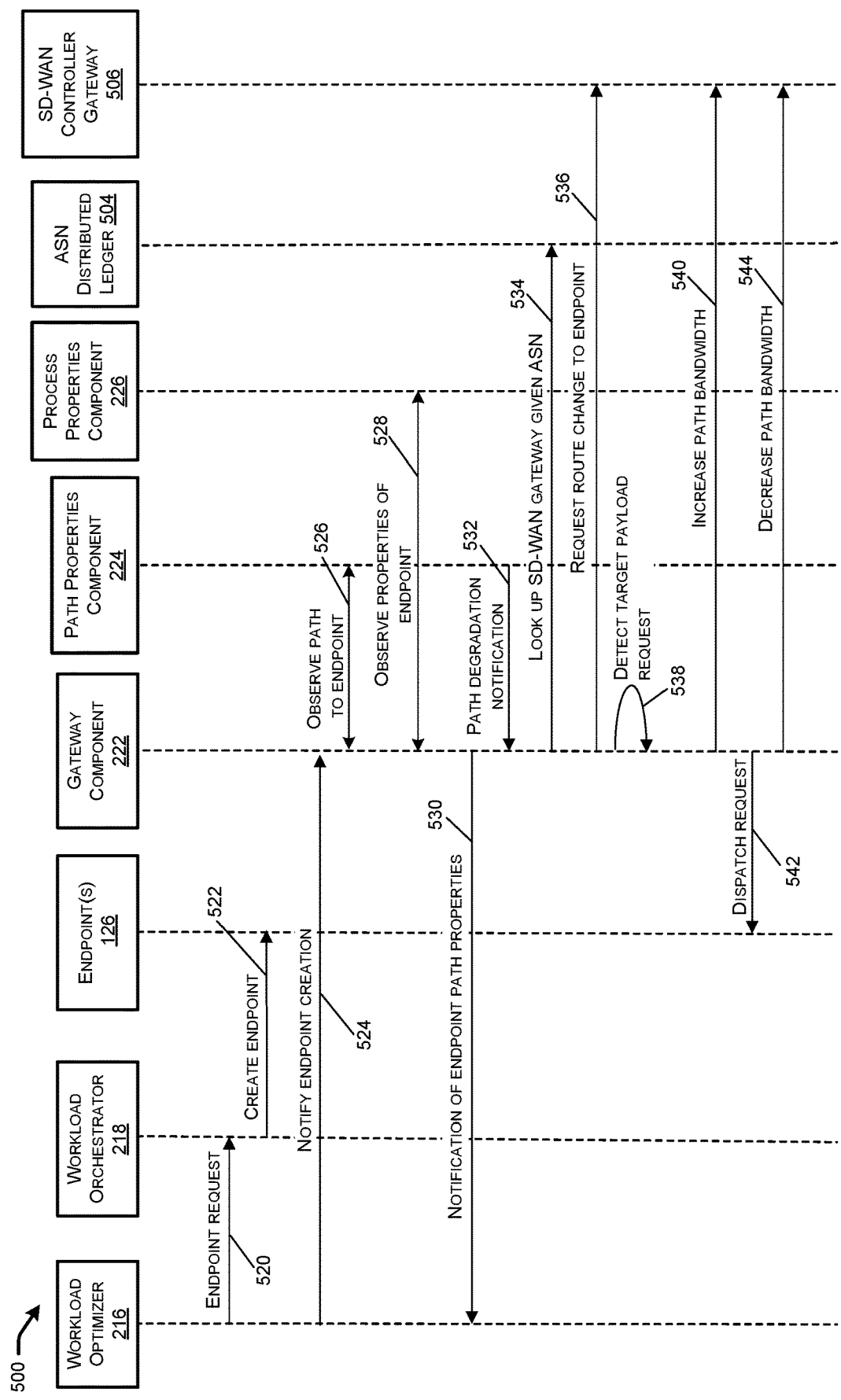
FIG. 5 illustrates a flow diagram of an example method for an API gateway interacting with a Software Defined-Wide Area Network (SD-WAN).

FIG. 5 illustrates a flow diagram of an example method for an API gateway interacting with a Software Defined-Wide Area Network (SD-WAN). This example method illustrates how the API gateway 124 may interact with a Software Defined-Wide Area Network (SD-WAN) controller gateway 506 to request path changes and initiate SD-WAN auto-scaling to increase or decrease bandwidth on paths from the API gateway to endpoints in response to detecting path degradation or requests that will results in large payloads.

The ASN distributed ledger 504 may supply a means for SD-WAN operators to register an SD-WAN controller gateway for specific ASNs that they may mange. Assuming the ASN can be obtained from the BGP path data provided by the path properties component 224, the corresponding SD-WAN controller gateway 506 can be looked up, and so be used to request data about a path.

At step 520, workload optimizer 216 request workload orchestrator 218 to create an endpoint. In some examples, the workload optimizer can move workloads between runtime environments to achieve optimal conditions, according to its own awareness of system state, signal received from other system components. For example, the workload optimizer 216 can be a real-time decision engine that drives continuous health of applications/processes across on-premises and public cloud environments. The workload optimizer 216 may continuously analyze workload consumption, costs and policy constraints across the full stack.

At step 522, the workload orchestrator 218 create the endpoint 126 according to the request it received from the workload optimizer 216. The workload orchestrator 218 may mange the deployment of workload in specific runtime environments. For, examples runtime environments include vSphere/vCenter, Kubernetes (K8s) pods, VM, deployment services from public cloud providers, etc.

At step 524, the workload optimizer 216 notifies the creation of endpoint to the gateway component 222. In some examples, an API endpoint includes a process that embodies coded logic to respond to API request. Such processes may be implemented in Java, Python, Go, etc., and may be run within VMs, containers in K8s, OSs running on base metal, etc.

At step 526, path properties component 224 observes the path to the endpoint. The path properties component 224 may supply data about network paths including their capacity, latency, jitter, routing hops, BGP ASN, encryption type, etc. For example, the path properties agent may be implemented by cloud, enterprise, and/or endpoint agents.

At step 528, process properties component 226 observes properties of endpoint. The process properties component 226 may provide the status of specific processes representing API endpoints described herein, and the runtime environment within which, the gateway, endpoint, or client process are running. Such data may include processing logic errors, relationship with other network devices, and response time requests, other processes, performance of the processes, memory, and CPU consumption with respect to baseline and available resources, etc.

At step 530, the gateway component 222 notifies the workload optimizer 216 of the endpoint path properties. In some examples, the path properties may be provided to the gateway component 222 by the path properties component 224. In some examples, the API gateway 124 may include components that provide data about the status of endpoints workloads, the path to those workloads, and how the workloads are managed and optimized.

At step 532, the gateway component 222 receives a path degradation notification from the path properties component 224. The path properties may include path capacity, latency, jitter, routing hops, BGP ASN, encryption type, etc.

At step 534, the gateway component 222 looks up the SD-WAN controller gateway 506 for the path that may be degrading, based on the data it obtained for BGP ASN path data in the step 526. Based on the path degradation, the gateway component 222 may initiate workload optimization actions. For example, the degradation that requires the workload optimization actions may include or correspond to increased request load, increased response latency, business transaction, a higher rate of connections failures, etc.

At step 536, the gateway component 222 requests a change in the route in the SD-WAN network between the API gateway 124 to the API endpoint 126. In some examples, the SD-WAN controller 506 may be responsible for establishing a new route, once it examines existing path conditions. In some examples, the API gateway 124 may additionally, or alternatively, move the endpoint 126.

At step 538, the gateway component 222 detects that a client is using an API with a large payload size. For example, the API gateway 124 may determine that the client has requested a backup of data.

At step 540, the gateway component 222 detects that the API client has submitted a request that requires a higher bandwidth connection, such as a request for a backup of data. The API gateway may increase the path bandwidth such that the path is able to support the request for the transmission of data.

At step 542, once the bandwidth is increased, then the gateway component 222 may dispatch the request. In some instances, the API client may dispatch request(s) concurrently (in addition to, or alternative to, sequentially) when delivering of the large files, and so the API Gateway 124 will be able to use its awareness of the API semantics to appropriately interact with the SD-WAN Controller Gateway 506. The increased bandwidth increases path capacity, and in turn may enable the path to more optimally transport the larger load detected at step 538.

At step 544, the gateway component 222 requests to decrease the bandwidth for the path between the API gateway 124 and the endpoint. Generally, the request to decrease the bandwidth would occur after the API gateway 124 detects that all file chunks have been delivered, either from a client to an endpoint, or vice-versa.

Figure 6:
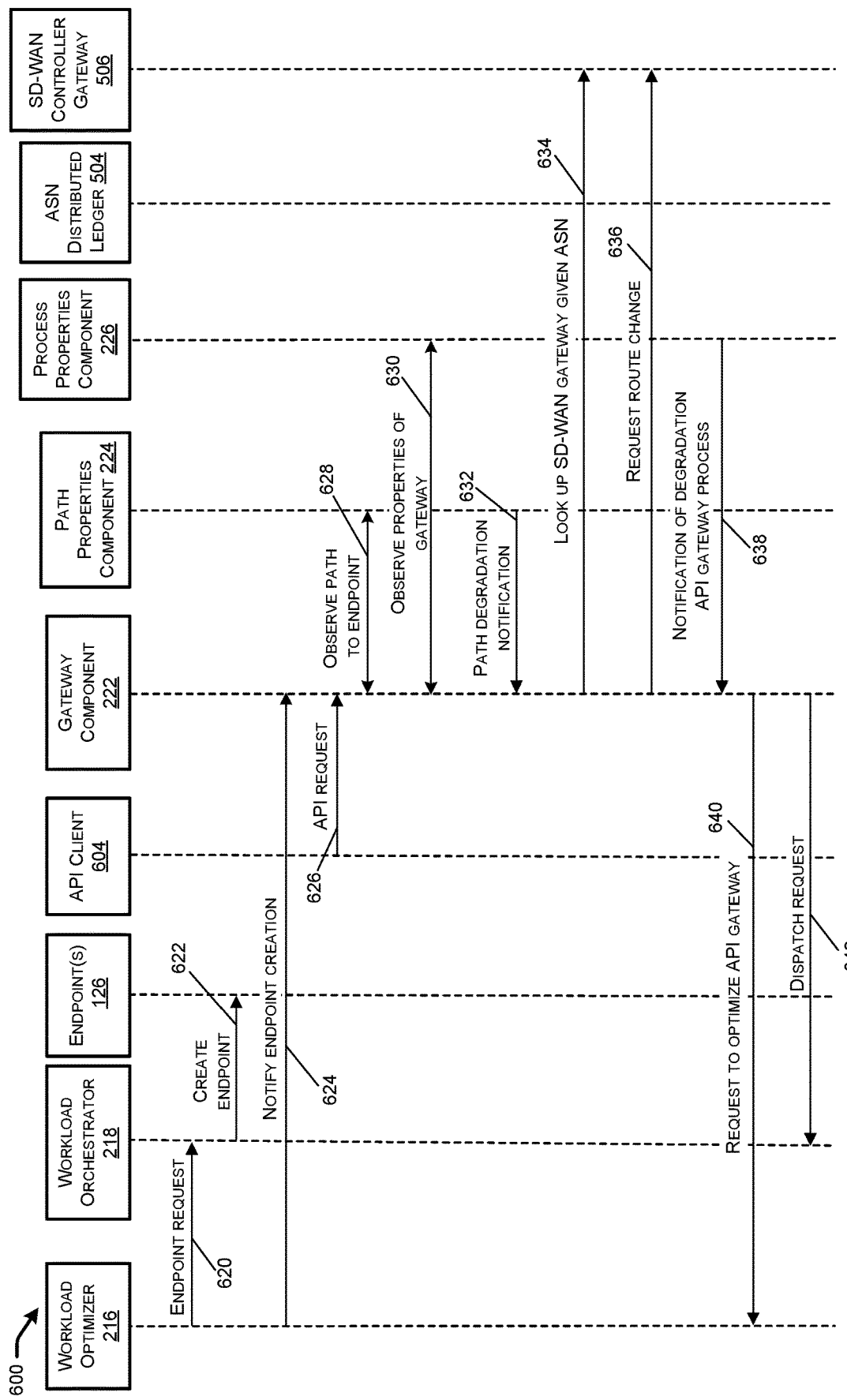
FIG. 6 illustrates a flow diagram of an example method for detecting client path degradation and gateway process degradation.

FIG. 6 illustrates a flow diagram of an example method for determining client path degradation and gateway process degradation. This example describes a scenario where the path under examination is between the API client and the API gateway, and the process being optimized is the API gateway. Although not illustrated, there may be an agent (or other process) running on the API client 604 that interacts with the API Gateway 124 such that the conditions of the path between the API Client 604 and the API Gateway 124 are known to the API Gateway 124.

At step 620, workload optimizer 216 request workload orchestrator 218 to create an endpoint. In some examples, the workload optimizer can move workloads between runtime environments to achieve optimal conditions, according to its own awareness of system state, signal received from other system components. For example, the workload optimizer 216 can be a real-time decision engine that drives continuous health of applications/processes across on-premises and public cloud environments. The workload optimizer 216 may continuously analyze workload consumption, costs, and policy constraints across the full stack.

At step 622, the workload orchestrator 218 creates the endpoint 126 according to the request it received from the workload optimizer 216. The workload orchestrator 218 may mange the deployment of workload in specific runtime environments. For, examples runtime environments include vSphere/vCenter, Kubernetes (K8s) pods, VM, deployment services from public cloud providers, etc.

At step 624, the workload optimizer 216 notifies the creation of endpoint to the gateway component 222. In some examples, an API endpoint includes a process that embodies coded logic to respond to API request. Such processes may be implemented in Java, Python, Go, etc., and may be run within VMs, containers in K8s, OSs running on base metal, etc.

At step 626, the API client 604 initiates a request to an API endpoint via the API gateway. At step 628, the path properties component 224 observes the path to the endpoint. The path properties component 224 may supply data about network paths including their capacity, latency, jitter, routing hops, BGP ASN, encryption type, etc. For example, the path properties agent may be implemented by cloud, enterprise, and/or endpoint agents.

At step 630, the process properties component 226 observes properties of endpoint. The process properties component 226 may provide the status of specific processes representing API endpoints described herein, and the runtime environment within which, the gateway, endpoint, or client process are running. Such data may include processing logic errors, relationship with other network devices, and response time requests, other processes, performance of the processes, memory, and CPU consumption with respect to baseline and available resources, etc.

At step 632, the gateway component 222 may receive a path degradation notification determined based on path properties. The path properties may include path capacity, latency, jitter, routing hops, BGP ASN, encryption type, etc.

At step 634, upon received the notification of a degradation in the path between the API client and API gateway 124, the gateway component 222 may query the SD-WAN controller gateway 506 for a path change using, for example, the BGP ASN. However, while BGP ASN lookups are one example, there may be additional ways to locate which SD-WAN controller gateway 506 to talk to. That is, there may be other techniques used to locate the SD-WAN controller gateway 506 (including prior knowledge).

At step 636, the gateway component 222 requests that the SD-WAN controller gateway 506 initiate a route change. In some example, the gateway component 222 may request the workload optimizer 216 to move existing endpoints or create an endpoint to change the route.

At step 638, SD-WAN controller gateway 506 sends the notification of a degradation in the API gateway process or runtime to the API gateway. The path degradation properties may be reported to SD-WAN controller gateway 506 by the path properties component 226 which may provide data about network paths.

At step 640, upon a notification of a degradation in the API gateway process or runtime, the API gateway may trigger remediation via request to the workload optimizer. The remediation may include creating endpoints, moving the existing endpoints, changing SD-WAN paths. The gateway component 222 may determine the remedial action based on its awareness of API request load, and properties associated with the API requests source client, path from client to the API gateway, path from the API gateway to the endpoints, and other API gateways in the network.

At step 642, the gateway component 222 dispatches the request, and sends the response to the API client. Once the requests are dispatched, the gateway component 222 may initiate processing another request.

It should be noted that FIG. 6 describes an example where both (i) degradation in a path and (ii) degradation in an API gateway process occur. While this is one embodiment of the invention, it should be appreciated that the techniques may also be split out. That is, the process of detecting path degradation and performing a remedial action to remedy the path degradation may be performed individually. Similarly, the process of detecting degradation in an API gateway process and performing a remedial action to remedy the API gateway process degradation may be performed individually.

Figure 7:
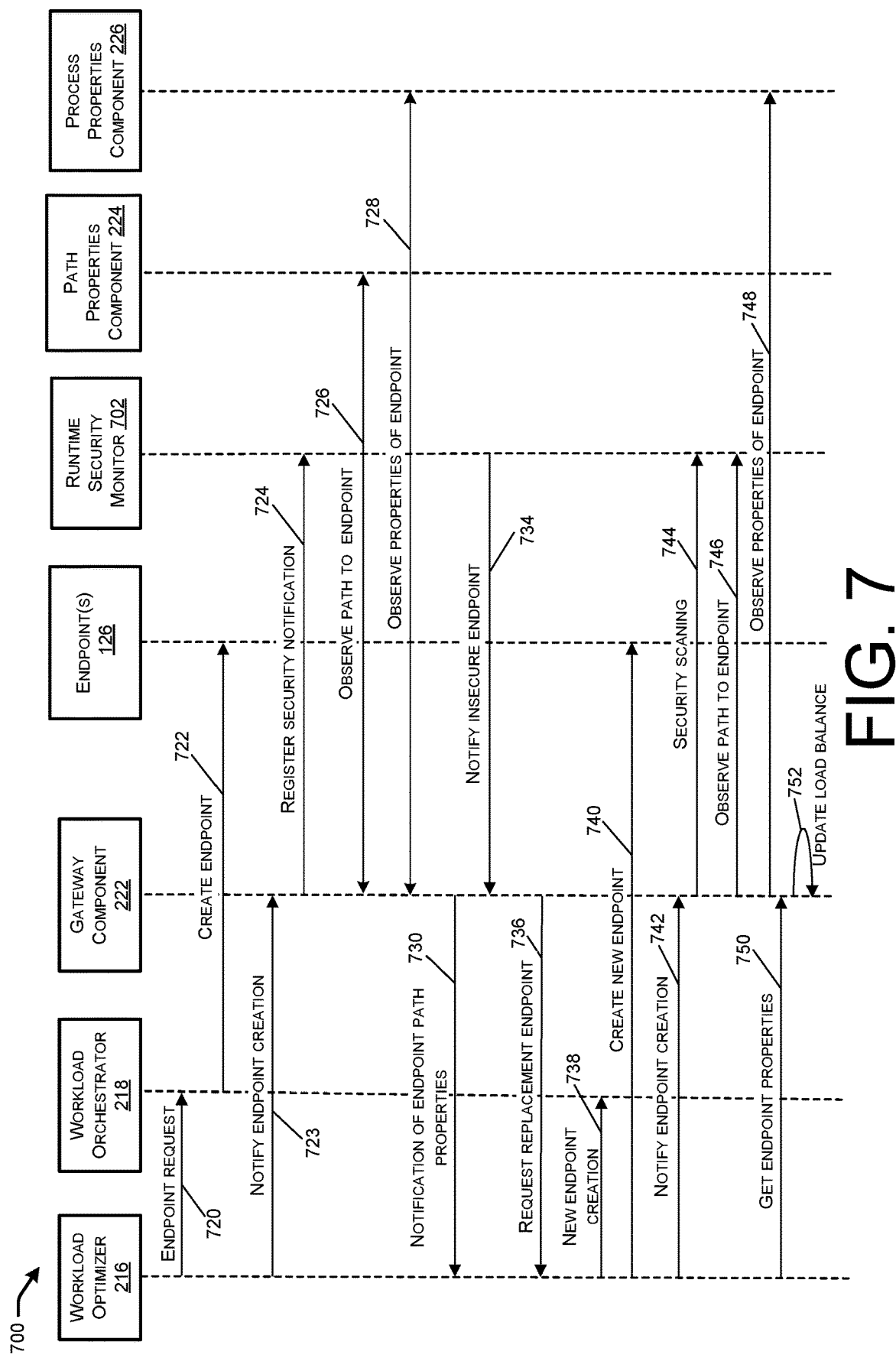
FIG. 7 illustrates a flow diagram of an example method for an API gateway interacting with a run time security component (agent).

FIG. 7 illustrates a flow diagram of an example method for an API gateway. This example describes a scenario where the API gateway may interact with the runtime environment or an agent on behalf of the runtime environment to continuously scan the security posture of endpoints and remove them from the load balanced request distribution in the case security posture of the endpoint, gateway or client processes fail to meet specific criteria. In some instances, in addition to removing the endpoints, the techniques may include replacing the removed endpoints with endpoints that are compliant with the required security posture, where the required security posture is indicated by some combination of the client location, API gateway location, endpoint location, types of encryption of paths, location of nodes and links in paths, relative to properties of a given API request, properties of the API generally, properties of the API payload, properties of the client, API gateway, and/or endpoint run time, and the like.

The run time security monitor 702 which may be responsible for ensuring the integrity of and security of the API endpoint instances. The security monitor may perform scans of images, network instances, and may check on data storage.

At step 720, workload optimizer 216 request workload orchestrator 218 to create an endpoint. In some examples, the workload optimizer can move workloads between runtime environments to achieve optimal conditions, according to its own awareness of system state, signal received from other system components. For example, the workload optimizer 216 can be a real-time decision engine that drives continuous health of applications/processes across on-premises and public cloud environments. The workload optimizer 216 may continuously analyze workload consumption, costs, and policy constraints across the full stack.

At step 722, the workload orchestrator 218 creates the endpoint 126 according to the request it received from the workload optimizer 216. The workload orchestrator 218 may mange the deployment of workload in specific runtime environments. For, examples runtime environments include vSphere/vCenter, Kubernetes (K8s) pods, VM, deployment services from public cloud providers, etc.

At step 723, the workload optimizer 216 notifies the gateway component 222 about the creation of endpoint, and updates registration for the endpoint. In some examples, an API endpoint includes a process that embodies coded logic to respond to API request. Such processes may be implemented in Java, Python, Go, etc., and may be run within VMs, containers in K8s, OSs running on bare metal, etc.

At step 724, the gateway component 222 registers security notification of the created endpoint with the runtime security monitor 702. The runtime security monitor component 702 can ensure that the security and integrity of the endpoint instances.

At step 726, the gateway component 222 observes the path properties to the endpoint. The path properties may include path capacity, latency, jitter, routing hops, BGP ASN, encryption type, etc., and may be provided by the path properties component 224.

At step 728, process properties component 226 observes properties of endpoint. The gateway component 222 may determine that one of the endpoints has become insecure. The process properties component 226 provides data about the status of specific processes representing API endpoints, and the runtime environment within which the gateway, endpoints, or client process are running. In another example, where the client is not running in a secure environment, the API gateway may block the response due to the environment being insecure.

At step 730, the gateway component 222 notifies the workload optimizer 216 of the path properties. The workload optimizer 216 may move the endpoints or create an endpoint based on the received path properties.

At step 734, once the runtime security monitor 702 determines the insecurity of one of the endpoints 126, it may notify insecure endpoint to the gateway component 222. The runtime security monitor 702 may perform scans of images, network interactions, check the provenance of data source with respect to location and/or environment of the requesting endpoint process, and/or check on the data storage to verify the endpoint instances.

At step 736, the gateway component 222 requests the replacement of the endpoints due to security. In some scenarios, the runtime security monitor 702 may not verify the security of the endpoint, and thus the API gateway may request to replace the unsecured endpoint 126.

At step 738, workload optimizer 216 requests the workload orchestrator 218 to create the new endpoint, and replaces the unsecured endpoint 126.

At step 740, the workload optimizer 216 creates a new endpoint. The security of the new endpoint may be required to be verified by the runtime security monitor 702.

A step 742, the workload optimizer 216 notifies the API gateway that the new endpoint has been created. Once the gateway component 222 receives the notification of the creation of the new endpoint, it may request the runtime security monitor 702 to perform the security validation process described previously.

At step 744, the runtime security monitor 702 performs scans of images, network interactions and checks the security of the API endpoint to validate the endpoint security, and/or checks the provenance of data source with respect to location and/or environment of the requesting endpoint process. If the security of the created endpoint is verified, the gateway component 222 proceeds with next step to process the request.

At step 746, the runtime security monitor 702 observes the path to the endpoint to determine whether a degradation has occurred in the path. The path properties may include path capacity, latency, jitter, routing hops, BPG ASN, encryption type, etc.

At step 748, the process properties component 226 observes the properties of the endpoint, and provides the data about the processes properties to the gateway component 222. In some examples, the process properties component may provide data about the status of the processes representing the API endpoints and the runtime environment within which the endpoint, or client processes are running.

At step 750, the workload optimizer 216 obtains the path properties of the newly created endpoint. The path properties may be provided to the gateway component 222 by the path properties component 224.

At step 750, the gateway component 222 updates the load balancing to ensure the insecure endpoint was removed, the new endpoint is added, and the load is distributed among the endpoints.

Figure 8:
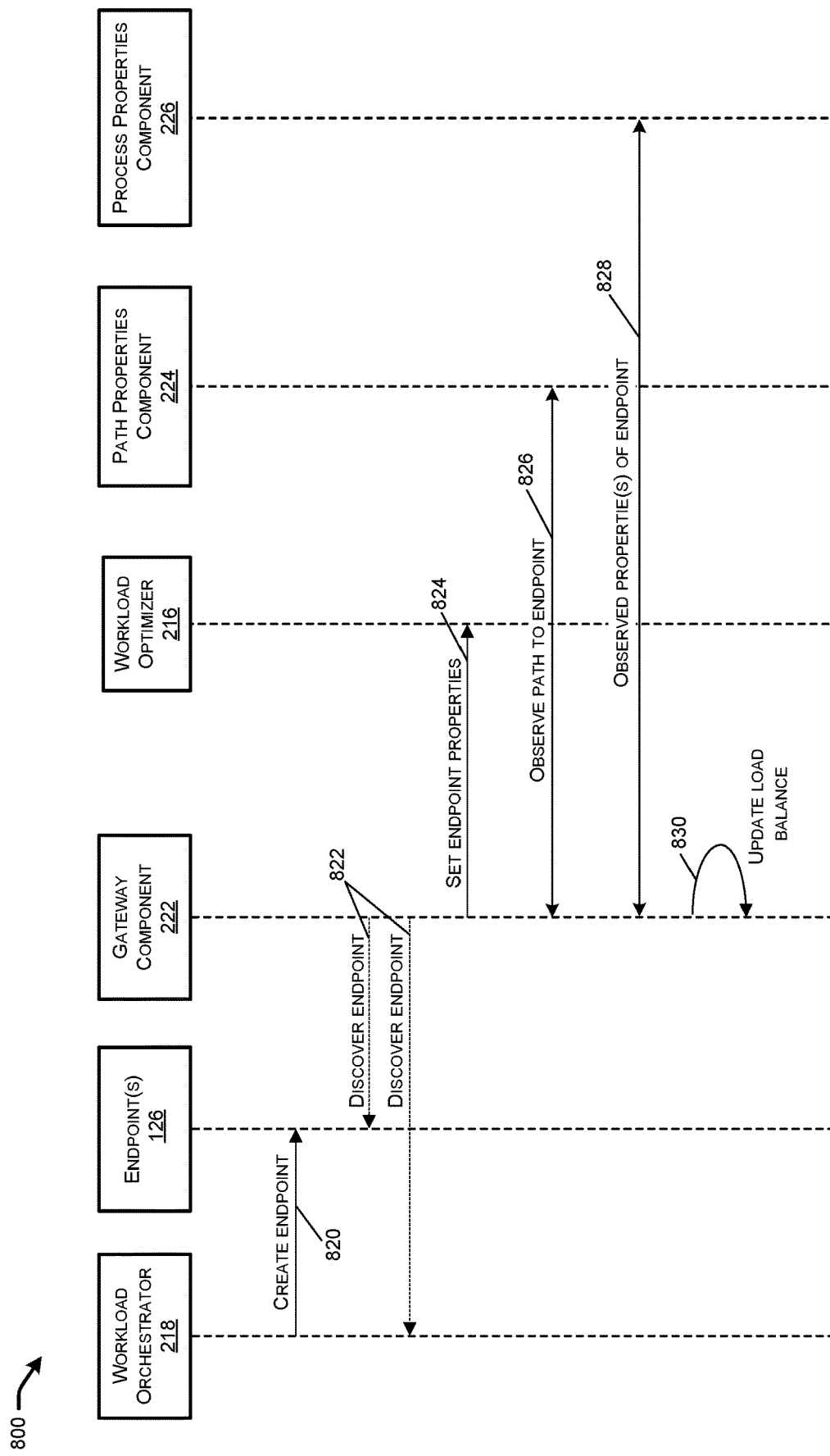
FIG. 8 illustrates a flow diagram of an example method for performing autonomous endpoint creation in the load balancing process.

FIG. 8 illustrates a flow diagram of an example method for performing autonomous endpoint creation in the load balancing process. This example embodies a scenario where an endpoint is created directly by a user or an autonomous system. In some examples, and outside event or action may cause the workload deployment orchestrator for the given environment to create an endpoint. In this scenario, the API gateway may not require a direct indication from the workload deployment orchestrator since it may discover the endpoint via control system or data plane detection. Once a new endpoint is discovered, the API gateway may interact with the other systems to convey the existence of the endpoint and the required properties.

At step 820, workload optimizer 216 request workload orchestrator 218 to create an endpoint. In some examples, the workload optimizer can move workloads between runtime environments to achieve optimal conditions, according to its own awareness of system state, signal received from other system components. For example, the workload optimizer 216 can be a real-time decision engine that drives continuous health of applications/processes across on-premises and public cloud environments. The workload optimizer 216 may continuously analyze workload consumption, costs, and policy constraints across the full stack.

At step 822, the gateway component 222 discovers the created endpoint. In some examples, the gateway component 222 may not have any direct interaction to discover the creation of the endpoint, and the gateway component 222 may discover the creation of the endpoint via a network control system or data plane.

At step 824, the gateway component 222 sets endpoint properties. The endpoint properties are related to the path between the endpoint and the API gateway, and may include properties may include path capacity, latency, jitter, routing hops, BPG ASN, encryption type, etc.

At step 826, the path properties component 224 observes the path to the endpoint to determine if a degradation has occurred in the path. The path degradations may include increased request load, increased response latency, business transaction failures, a higher rate of connection failures, etc.

At step 828, the process properties component 224 observes the properties of the endpoint, and provide the data about the network path to the API gateway. Such data may include processing logic errors, relationships with other processes, response time of requests to other processes, performance of the processes, memory, and processor consumption, etc.

At step 830, the gateway component 222 updates the load balancing such that the new, created endpoint (step 820) is added as a potential target endpoint for the gateway component 222.

Figure 9:
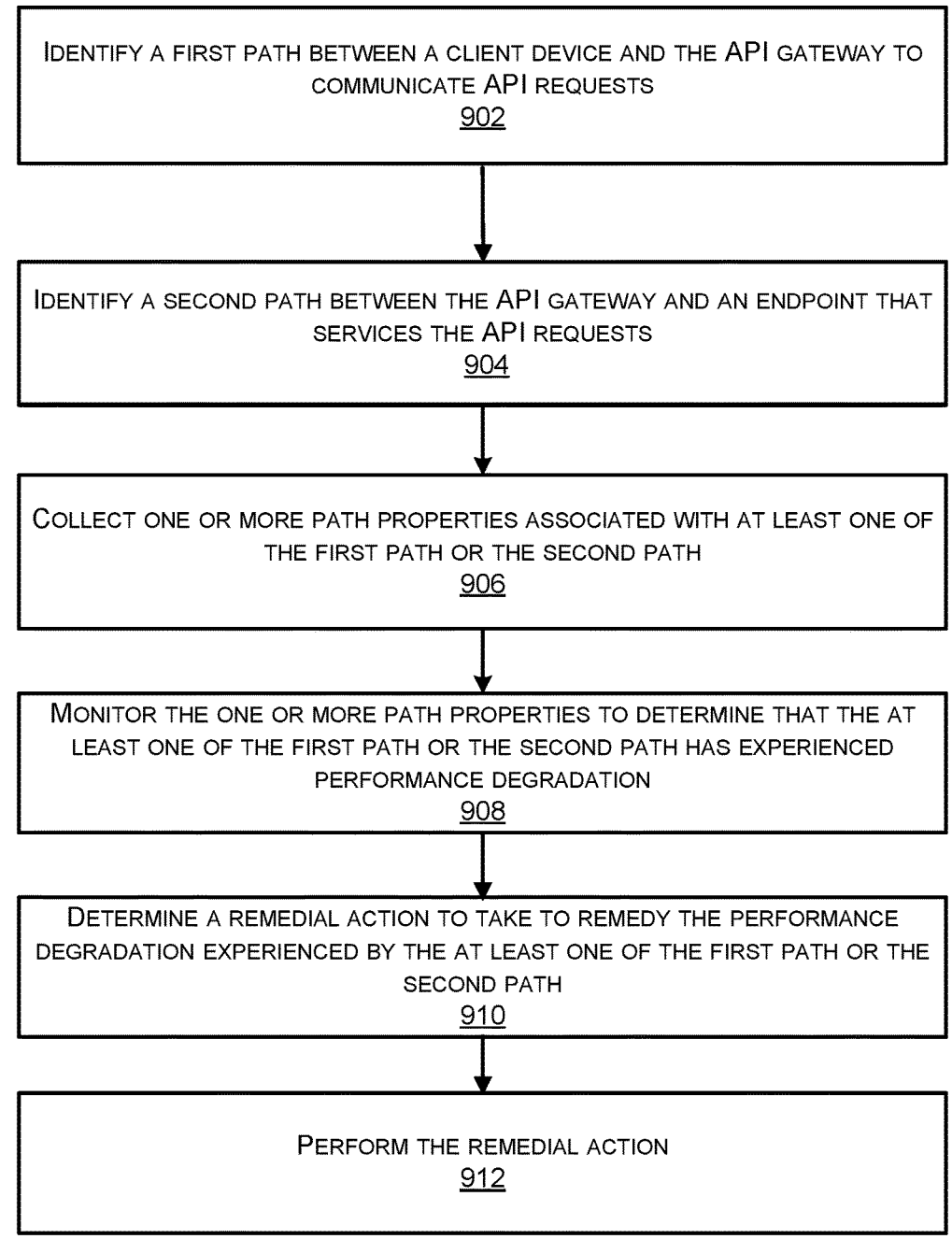
FIG. 9 illustrates a flow diagram of an example method for an API gateway to detect performance degradation in a path and performing a remedial action.

FIG. 9 illustrates a flow diagram of an example method for performing load balancing in an API gateway. As described herein, in some scenarios, the API gateway may include a load balancing functionality to balance load among one or many endpoints to achieve optimal conditions. Accordingly, the API requests for the API gateway, may be sent to one, or more endpoints that can process the API request.

At step 902, the API gateway identifies a first path between a client device and the API gateway to communicate API requests. The first path may be created between the API gateway and client device using any protocol usable for communicating data, such as API requests, responses, etc.

At step 904, the API gateway establishes a second path between the API gateway and an endpoint that services the API requests. The second path may be created on the endpoint due to the workload optimizer and/or workload deployment orchestrator placing the endpoint workload.

At step 906, the API gateway collects one or more path properties associated with at least one of the first path or the second path. The path properties may indicate data about network paths, such as capacity, latency, jitter, routing hops, BGP ASN, encryption type, etc. The API gateway may determine the path quality from the obtained path properties.

At step 908, the API gateway monitors the one or more path properties to determine that the at least one of the first path or the second path has experienced performance degradation. The path degradations may include increased request load, increased response latency, business transaction failures, a higher rate of connection failures, failure to conform to regulatory compliance conditions, etc.

At step 910, the API gateway determines a remedial action to take to remedy the performance degradation experienced by the at least one of the first path or the second path. In some examples, the API gateway may move the endpoint, change the path route, change path properties, change endpoint workload properties, etc.

At step 912, the API gateway performs the remedial action to move the endpoint or change the route, and thus optimizes the workload or otherwise brings the overall system into a state of optimal compliance. Traditional API gateways might consider the state of workloads (e.g., load-aware load balancing) based on, for example, the CPU load of servers. However, the API gateway described herein comprises, or is included in, an aware API gateway system that takes into account various other parameters beyond simply looking at the loads of the workloads. While the load of the workloads may be contemplated as part of the optimal compliance, one or more of the parameters described herein (e.g., path properties, client posture, data sovereignty, required encryption, API semantics, etc.) may additionally be used to determine optimal compliance for moving the endpoint, changing the route, changing path properties, etc.

Figure 10:
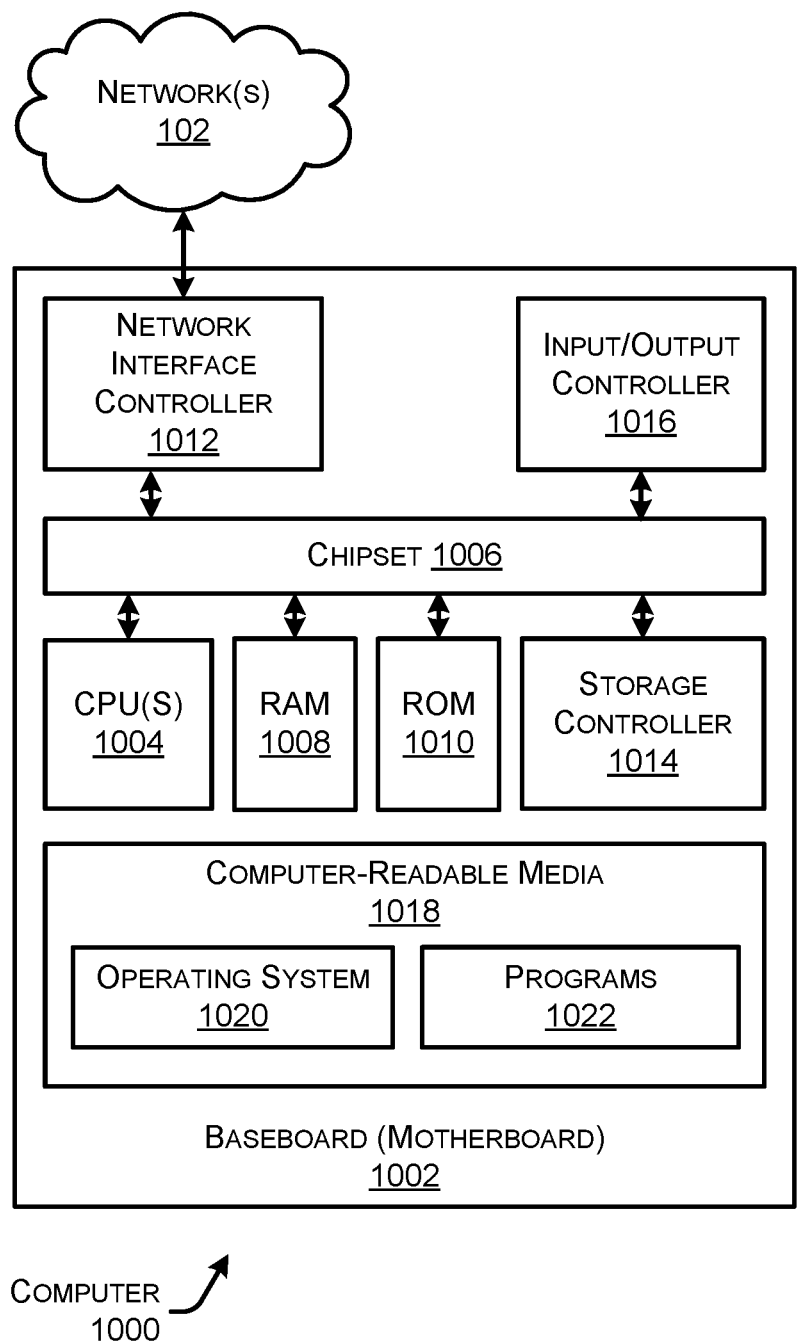
FIG. 10 is a computer architecture diagram showing an illustrative computer hardware architecture for implementing a computing device that can be utilized to implement aspects of the various technologies presented herein.

FIG. 10 shows an example computer architecture for a device capable of executing program components for implementing the functionality described above. The computer architecture shown in FIG. 10 illustrates any type of computer 1000, such as a conventional server computer, workstation, desktop computer, laptop, tablet, network appliance, e-reader, smartphone, or other computing device, and can be utilized to execute any of the software components presented herein. The computer 1000 may, in some examples, correspond to an API gateway 124, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 600 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the networks 102, 122. The chipset 1006 can include functionality for providing network connectivity through a NIC 1012, such as a gigabit Ethernet adapter. The NIC 1012 is capable of connecting the computer 1000 to other computing devices over the network 122. It should be appreciated that multiple NICs 1012 can be present in the computer 1000, connecting the computer to other types of networks and remote computer systems.

The computer 1000 can be connected to a storage device 1018 that provides non-volatile storage for the computer. The storage device 1014 can store an operating system 1020, programs 1022, and data, which have been described in greater detail herein. The storage device 1018 can be connected to the computer 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device is characterized as primary or secondary storage, and the like.

For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 618 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the client device 106, API gateway 124, and or any components included therein, may be supported by one or more devices similar to computer 1000. Stated otherwise, some or all of the operations performed by the API gateway 124, and or any components included therein, may be performed by one or more computer devices 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1014 can store other system or application programs and data utilized by the computer 1000

In one embodiment, the storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 600 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-9. The computer 1000 can also include computer-readable storage media having instructions stored thereupon for performing any of the other computer-implemented operations described herein.

The computer 1000 can also include one or more input/output controllers 616 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIGS. 1-2, can include other components that are not explicitly shown in FIG. 1-2, or might utilize an architecture completely different than that shown in FIG. 1-2.

As described herein, the computer 1000 may comprise one or more of API gateway 124, and/or any other device. The computer 1000 may include one or more hardware processors 1004 (processors) configured to execute one or more stored instructions. The processor(s) 1004 may comprise one or more cores. Further, the computer 1000 may include one or more network interfaces configured to provide communications between the computer 1000 and other devices, such as the communications described herein as being performed by the API gateway 124. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure for workload optimization by the API gateway in a network environment.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of monitoring path properties for one or more paths between a client device and an Application Programming Interface (API) gateway or between the API gateway and an endpoint, the method comprising:
   identifying a first network path between the client device and the API gateway, the first network path configured to communicate API requests from the client device and to the API gateway;
   identifying a second network path between the API gateway and the endpoint that services the API requests, the second network path configured to communicate the API requests between the API gateway and the endpoint;
   collecting one or more path properties associated with the second network path indicating a performance of the second network path when communicating the API requests;
   monitoring the one or more path properties to determine that the second network path has experienced performance degradation;
   determining a remedial action to take to that improves the performance degradation experienced by the second network path between the API gateway and the endpoint; and
   performing the remedial action that improves the performance degradation experienced by the second network path.

2. The method of claim 1, wherein monitoring the one or more path properties includes determining that at least one of latency, jitter, encryption, packet loss, a broken connection, or quality of service of a portion the second network path has degraded below a threshold.

3. The method of claim 1, wherein performing the remedial action includes:
   moving the API gateway to a new location.

4. The method of claim 1, further comprising:
   determining that the first network path experienced respective performance degradation; and
   instructing a network controller associated with a Software Defined-Wide Area network (SD-WAN) to increase network resources of the first network path.

5. The method of claim 1, wherein:
   the remedial action comprises moving the endpoint to a new location.

6. The method of claim 1, wherein performing the remedial action comprises:
   removing the endpoint from being associated with the second network path; and
   creating a new endpoint associated with a third network path between the API gateway and the new endpoint.

7. The method of claim 1, further comprising:
   receiving a Border Gateway Protocol (BGP) ASN, by a path property agent, at the API gateway;
   identifying a network controller associated with the first network path; and
   instructing the network controller to change from sending traffic over the first network path and to a third path between the client device and the API gateway.

8. The method of claim 1, further comprising analyzing the one or more path properties to determine that the performance degradation is caused at least partly by the API gateway.

9. The method of claim 8, further comprising allocating additional resources for use by the API gateway.

10. The method of claim 1, further comprising:
    receiving performance data indicating a performance metric associated with the endpoint;
    determining that the performance metric has fallen below a threshold performance metric permitted for the endpoint indicating degradation in performance of the endpoint; and
    performing an additional remedial action to remedy the degradation in the performance of the endpoint.

11. The method of claim 1, further comprising:
    analyzing the one or more path properties to determine that the performance degradation is caused at least partly by the API gateway; and
    instructing a network controller to modify the second network path based at least in part on the analyzing.

12. The method of claim 1, further comprising triggering a remediation, by the API gateway, to a workload optimizer upon receiving a notification of the performance degradation.

13. The method of claim 1, further comprising:
    analyzing the one or more path properties to determine that the performance degradation is caused at least partly by the API gateway;
    tearing down the API gateway;
    allocating additional computing resources to the API gateway; and
    creating a new API gateway; or
    modifying a configuration parameter of the API gateway.

14. A system for monitoring path properties for one or more paths between a client device and an Application Programming Interface (API) gateway or between the API gateway and an endpoint, the system comprising:
    one or more processors; and
    one or more non-transitory computer-readable media storing computer-executable instructions that, when executed by the one or more processors, cause the one or more processors to:
      identify a first network path between a client device and the API gateway, the first network path configured to communicate API requests from the client device and to the API gateway;
      identify a second network path between the API gateway and an endpoint that services the API requests, the second network path configured to communicate the API requests between the API gateway and the endpoint;
      collect one or more path properties associated with the second network path indicating a performance of the second network path when communicating the API requests;
      monitor the one or more path properties to determine that the second network path has experienced performance degradation;
      determine a remedial action to take to that improves the performance degradation experienced by the second network path between the API gateway and the endpoint; and
      perform the remedial action that improves the performance degradation experienced by the second network path.

15. The system of claim 14, wherein monitoring the one or more path properties includes determining that at least one of latency, jitter, encryption, packet loss, a broken connection, or quality of service of a portion the second network path has degraded below a threshold.

16. The system of claim 14, wherein the performing the remedial action includes at least one of:

moving the API gateway to a new location;
allocating additional computing resources to the API gateway;
creating first additional instances of the API gateway; or
creating second additional instances that are geographically distributed.

17. The system of claim 14, wherein performing the remedial action includes instructing a network controller associated with a Software Defined-Wide Area network (SD-WAN) to increase network resources of the first network path.

18. The system of claim 14, wherein:
the remedial action comprises moving the endpoint to a new location.

19. The system of claim 14, wherein performing the remedial action includes at least one of:
removing the endpoint;
allocating additional computing resources to the endpoint; or
creating a new endpoint.

20. At least one non-transitory computer-readable storage medium having stored therein instructions which, when executed by one or more processors, cause the one or more processors to:

identify a first network path between a client device and an API gateway, the first network path configured to communicate API requests from the client device and to the API gateway;

identify a second network path between the API gateway and an endpoint that services the API requests, the second network path configured to communicate the API requests between the API gateway and the endpoint;

collect one or more path properties associated with the second network path indicating a performance of the second network path when communicating the API requests;

monitor the one or more path properties to determine that the second network path has experienced performance degradation;

determine a remedial action to take to that improves the performance degradation experienced by the second network path between the API gateway and the endpoint; and perform the remedial action that improves the performance degradation experienced by the second network path.

* * * * *